United States Patent
Weisheit et al.

(10) Patent No.: US 10,530,228 B2
(45) Date of Patent: Jan. 7, 2020

(54) SQUIRREL CAGE ROTOR WITH COPPER FILLED PLASTIC BARS AND RINGS

(71) Applicant: Nidec Motor Corporation, St. Louis, MO (US)

(72) Inventors: Mark D. Weisheit, Florissant, MO (US); Liming Zhou, Chesterfield, MO (US)

(73) Assignee: Nidec Motor Corporation, St. Louis, MO (US)

( * ) Notice: Subject to any disclaimer, the term of this patent is extended or adjusted under 35 U.S.C. 154(b) by 380 days.

(21) Appl. No.: 15/446,713

(22) Filed: Mar. 1, 2017

(65) Prior Publication Data
US 2017/0257013 A1    Sep. 7, 2017

Related U.S. Application Data

(60) Provisional application No. 62/301,896, filed on Mar. 1, 2016.

(51) Int. Cl.
| | | |
|---|---|---|
| H02K 17/16 | (2006.01) | |
| H02K 3/02 | (2006.01) | |
| H02K 3/12 | (2006.01) | |
| H02K 9/06 | (2006.01) | |

(52) U.S. Cl.
CPC ............ *H02K 17/165* (2013.01); *H02K 3/02* (2013.01); *H02K 3/12* (2013.01); *H02K 9/06* (2013.01); *H02K 2213/03* (2013.01)

(58) Field of Classification Search
CPC ........... H02K 7/16; H02K 7/165; H02K 3/02; H02K 3/12; H02K 9/06; H02K 2213/03
USPC .... 310/60 R, 211, 212, 156.78, 156.81, 125, 310/251, 252, 248
See application file for complete search history.

(56) References Cited

U.S. PATENT DOCUMENTS

| | | | | |
|---|---|---|---|---|
| 20,052,101 | * | 6/1935 | Petersen | H02K 3/02 310/211 |
| 2,252,277 | A * | 8/1941 | Tate | H01B 1/00 200/265 |
| 2,682,483 | A | 6/1954 | Erbe | |
| 2,761,854 | A | 9/1956 | Coler | |
| 3,003,975 | A | 10/1961 | Louis | |
| 3,140,342 | A | 7/1964 | Ehrreich et al. | |
| 3,278,455 | A | 10/1966 | Feather | |
| 3,412,043 | A | 11/1968 | Gilliland | |
| 3,491,056 | A | 1/1970 | Saunders et al. | |
| 3,708,387 | A | 1/1973 | Turner et al. | |

(Continued)

FOREIGN PATENT DOCUMENTS

EP    1100186    2/2003

OTHER PUBLICATIONS https://en.nn.wikipedia.org/wiki/Epoxy (Year: 2013).*

(Continued)

*Primary Examiner* — Mang Tin Bik Lian
*Assistant Examiner* — Ahmed Elnakib
(74) *Attorney, Agent, or Firm* — Hovey Williams LLP

(57) ABSTRACT

A rotating element for a dynamo-electric machine such as an electric induction motor. The rotating element includes a plurality of axially stacked laminations cooperatively defining a plurality of arcuately spaced bar slots. The rotating element also includes a plurality of bars, with each bar extending through one of the bar slots. Each of the bars comprises copper-impregnated polymer.

16 Claims, 6 Drawing Sheets

(56) References Cited

U.S. PATENT DOCUMENTS

| | | | |
|---|---|---|---|
| 3,919,122 A | 11/1975 | Tigner | |
| 3,983,075 A | 9/1976 | Marshall et al. | |
| 4,610,808 A | 9/1986 | Kleiner | |
| 4,763,403 A * | 8/1988 | Klein | H02K 3/26 156/89.18 |
| 4,880,570 A * | 11/1989 | Sanborn | H01R 4/04 252/512 |
| 5,087,314 A * | 2/1992 | Sandborn | H01R 4/04 156/327 |
| 5,144,175 A * | 9/1992 | Craggs | H02K 1/32 310/61 |
| 5,886,443 A * | 3/1999 | Dymond | H02K 17/165 310/125 |
| 2002/0005247 A1* | 1/2002 | Graham | C09J 9/02 156/291 |
| 2005/0206270 A1* | 9/2005 | Aisenbrey | H02K 1/02 310/251 |
| 2006/0066168 A1* | 3/2006 | Shoykhet | H02K 15/12 310/211 |
| 2006/0137587 A1 | 6/2006 | Aisenbrey | |
| 2006/0150396 A1 | 7/2006 | Sweo | |
| 2007/0290569 A1 | 12/2007 | Bode et al. | |
| 2008/0251769 A1 | 10/2008 | Li et al. | |
| 2013/0154430 A1 | 6/2013 | Dragon et al. | |
| 2013/0291372 A1 | 11/2013 | Meyer et al. | |
| 2015/0102697 A1* | 4/2015 | Jung | H02K 1/265 310/211 |

OTHER PUBLICATIONS https://www.nde-ed.org/GeneralResources/IACS/IACS.htm (Year: 2014).*

PCT International Search Report and Written Opinion from PCT Application No. PCT/US2017/020244 entitled Squirrel Cage Rotor With Copper Filled Plastic Bars and Rings (dated May 29, 2017).

IEEE/PCIC 2000 Conference Record Paper No. PCIC-2000-19 entitled Selection of Copper vs. Aluminum Rotors for Induction Motors; Finley, William R., Hodowanec, Mark M. (2000).

* cited by examiner

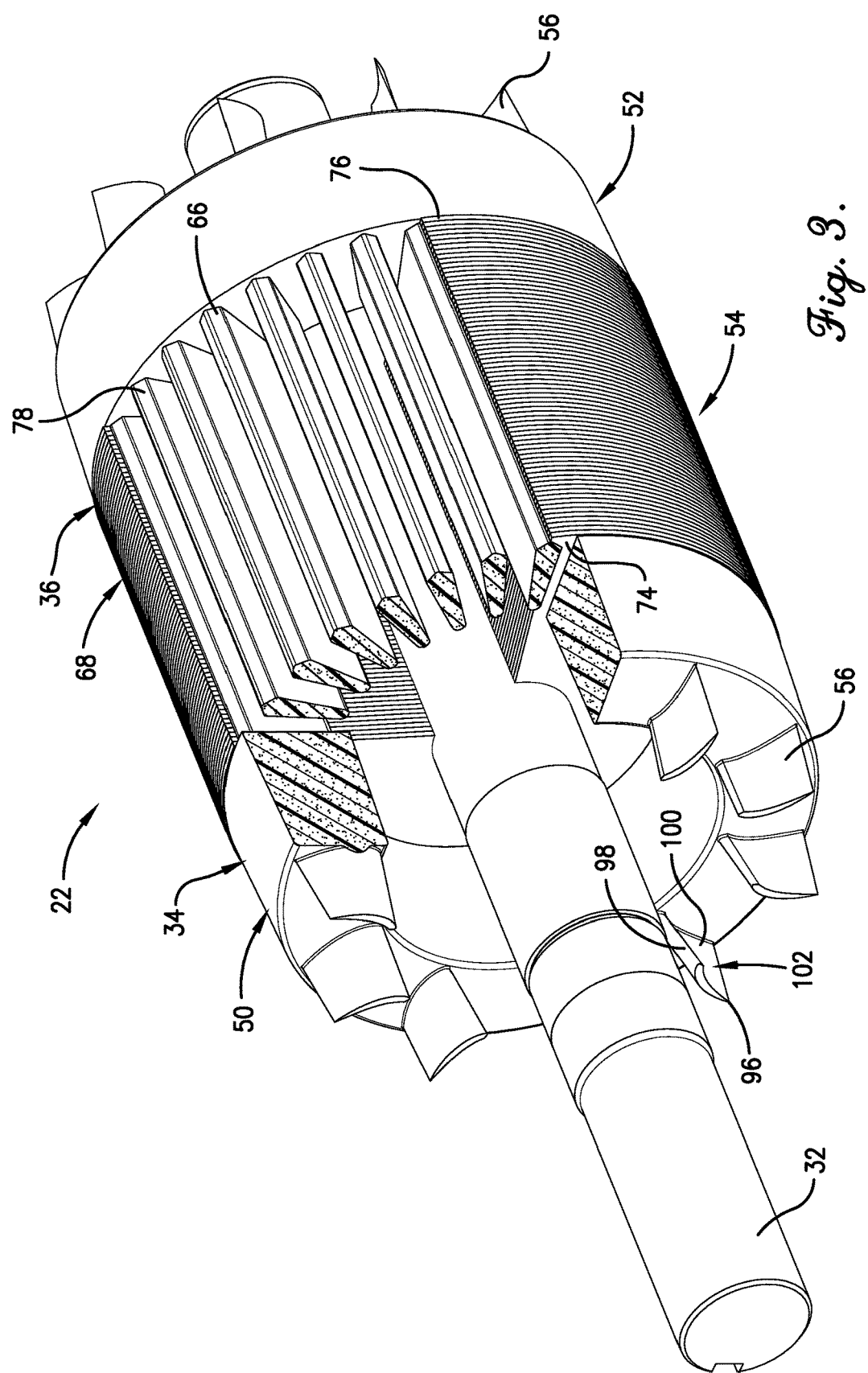

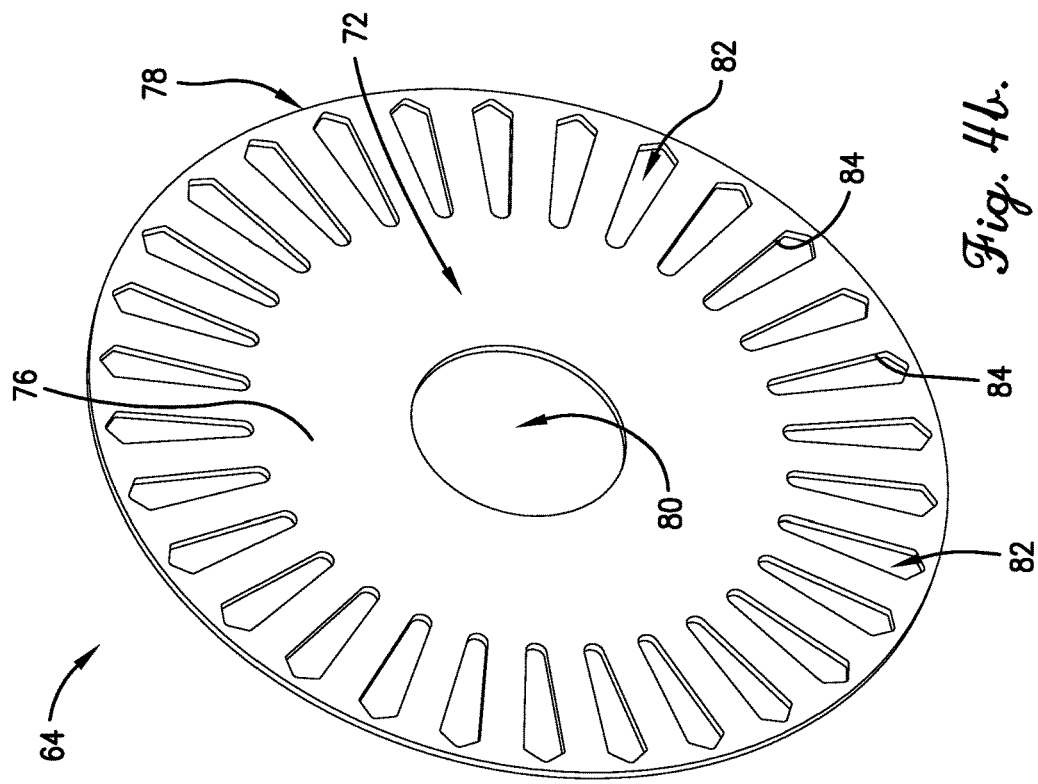
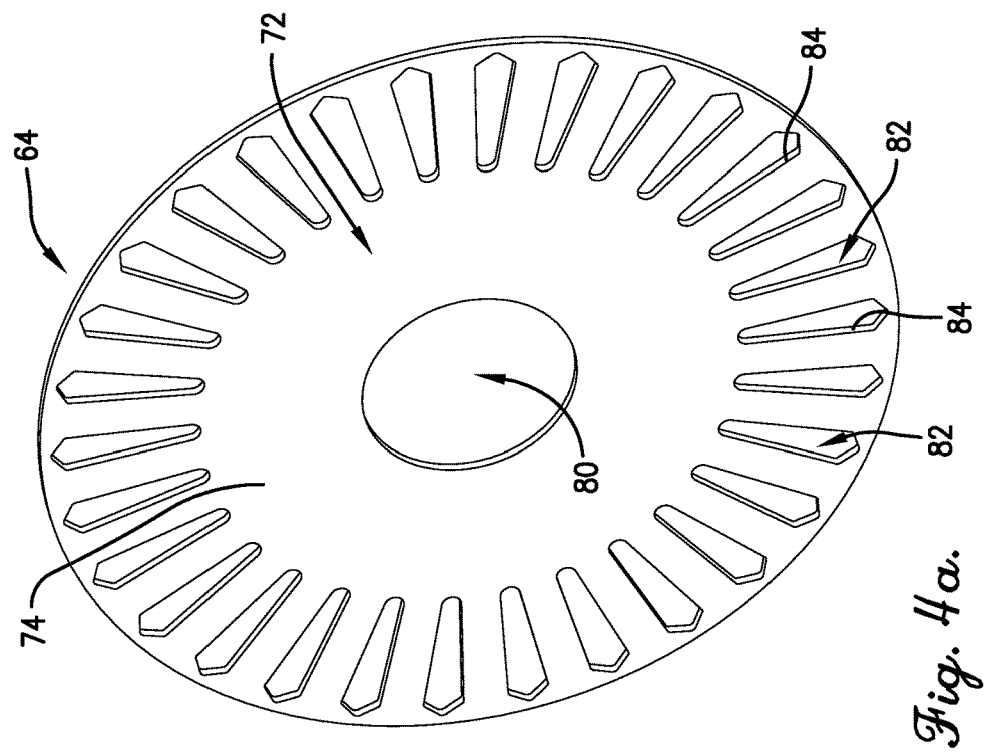

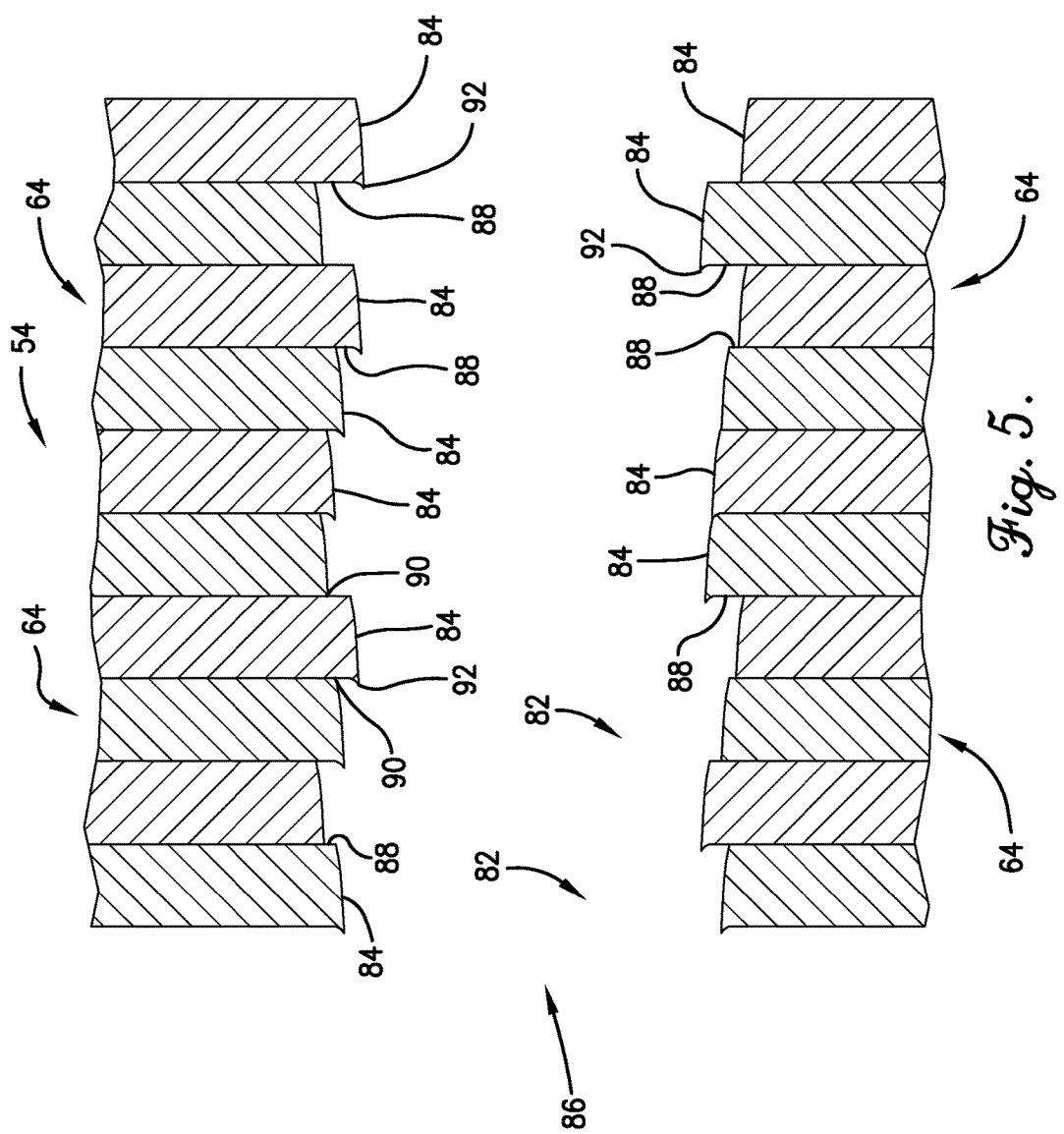

SQUIRREL CAGE ROTOR WITH COPPER FILLED PLASTIC BARS AND RINGS

CROSS-REFERENCE TO RELATED APPLICATION

The present application claims the benefit of and priority from U.S. Provisional Patent Application Ser. No. 62/301,896, filed Mar. 1, 2016, the entire disclosure of which is hereby incorporated by reference herein.

BACKGROUND OF THE INVENTION

1. Field of the Invention

The present invention relates generally to a rotating element for a dynamo-electric machine. More specifically, the present invention concerns a rotating element that includes bars comprising copper-impregnated polymer.

2. Discussion of the Prior Art

Squirrel cage rotors for electric induction machines generally include a laminated stack (rotor core) that defines a plurality of elongated slots. A plurality of conductive bars are provided in the elongated slots. A pair of end rings may be provided at axially opposite ends of the laminated stack to electrically short the conductive bars.

Squirrel cage rotors may be constructed by placing the rotor core in a cast or set of casts. A casting material is injected into the cast(s) to form the end rings and the conductive bars. The casting material generally comprises an electrically conductive material such as an aluminum alloy. Depending on the motor application, copper casting materials are often more desirable than aluminum-based casting materials because of the superior electrical conductance of copper. More particularly, copper rotor bars and end rings can provide as much as a four percent (4%) improvement in motor efficiency compared to aluminum alternatives.

However, copper is extremely difficult to cast. As a result, prior attempts to pour-cast or dip-cast, for example, an integral copper squirrel cage onto a rotor core have failed. To date, the only commercially viable method for casting integral copper bar-to-end ring squirrel cage rotors is to utilize high pressure die casting methods. However, this process is generally not commercially viable because the temperature required to liquefy copper alloys damages the casting tools, which necessitates more frequent tool replacement. Moreover, standard (aluminum) high-pressure die casting machinery cannot withstand the temperatures required for copper casting applications; thus, the manufacturer must purchase additional casting equipment of sufficient durability for copper casting. The increased production costs associated with tool replacement is exacerbated if the manufacturer builds different motor designs, each requiring unique casting tools. Furthermore, molten copper is extremely hydrophilic and must be shielded from oxygen in an inert atmosphere, which may also require the manufacturer to purchase additional equipment and/or facilities.

In addition to the increased production costs associated with casting equipment, there are significant engineering challenges associated with using copper alloy casting materials. The heat transferred from the copper alloy casting material can damage the iron (or steel) rotor core. For example, the heat transferred from the copper alloy casting to the rotor core can cause warping, welding, and coating burn off. Compounds from the coating burn off can contaminate the copper alloy casting, which can reduce motor efficiency. Additionally, molten copper experiences magnetic levitation, which must be addressed during casting. The liquid metal head of molten copper (ferrostatic pressure) must also be accounted for during die-casting. Because of significant thermal contraction of the copper alloy casting as the material cools, molded parts tend to shrink-fit onto the mold, so the dimensions and shapes of the parts are severely limited. Moreover, cooling of the molten copper alloy while the material flows can result in non-amorphous grain structures, which corresponds to weak points in the molded part. In sum, achieving the efficiency of a squirrel cage induction motor having copper conductive bars is presently quite expensive, and even when constructed properly may result in a damaged motor before even beginning operation.

SUMMARY

According to an aspect of the present invention, a rotating element for a dynamo-electric machine is provided. The rotating element includes a plurality of axially stacked laminations cooperatively defining a plurality of arcuately spaced bar slots. The rotating element also includes a plurality of bars, with each bar extending through one of the bar slots. Each of the bars comprises copper-impregnated polymer. The copper-impregnated polymer bars allow for improved efficiency without requiring prohibitively expensive manufacturing techniques and/or compromising the structural integrity of the dynamo-electric machine.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 3 is an isometric, partial sectional view of the rotor assembly of FIG. 1, shown with rotor laminations having a quarter section removed to reveal details of a sectioned end ring and several integral copper-impregnated polymer bars;

FIGS. 4a and 4b are isometric views of one of the rotor laminations of the induction motor assembly of FIG. 1, depicting in detail the structural configuration of the lamination along front and back faces;

Figure 1:
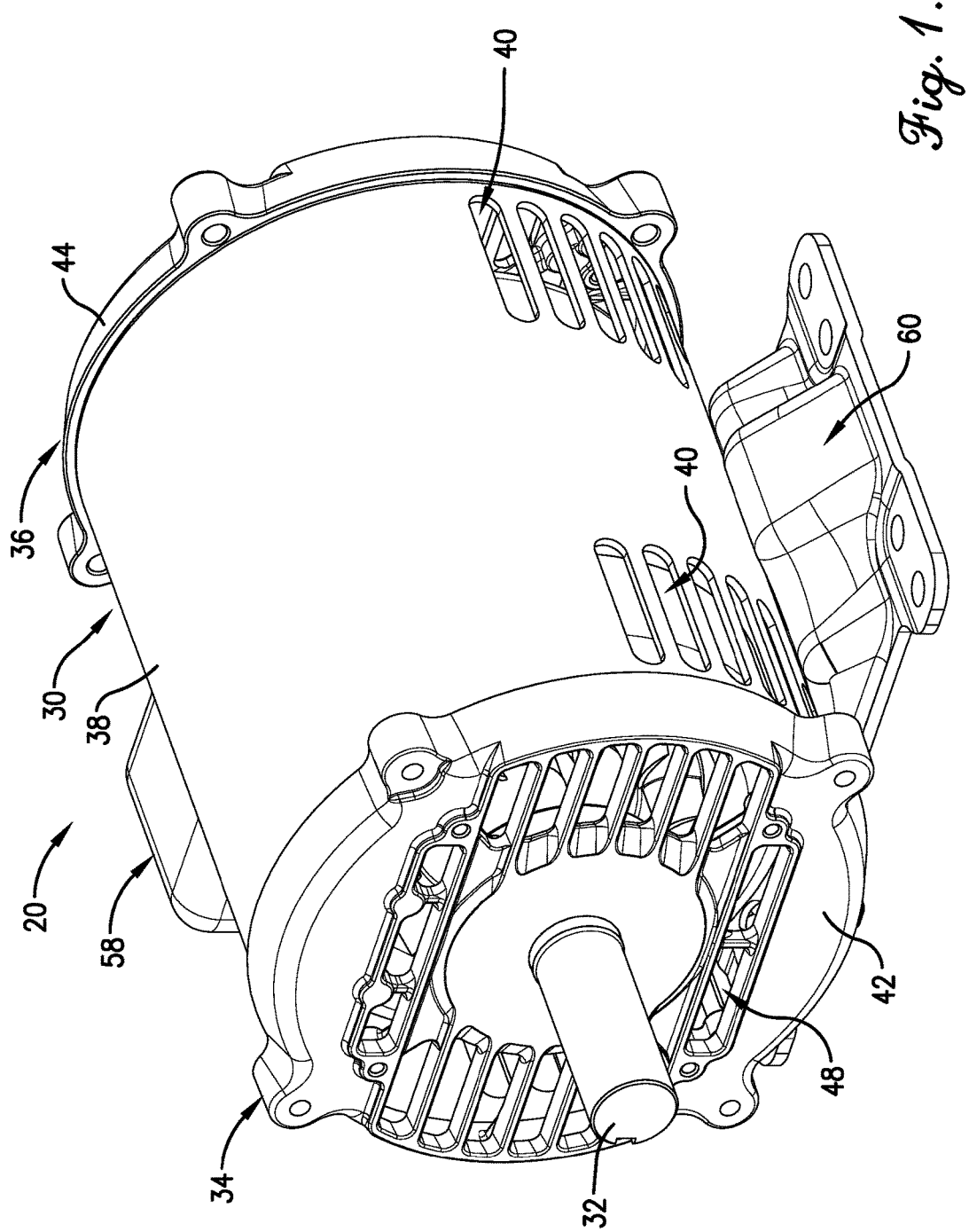
FIG. 1 is an isometric view of an electric induction motor assembly constructed in accordance with the principles of a preferred embodiment of the present invention.
Figure 6B:
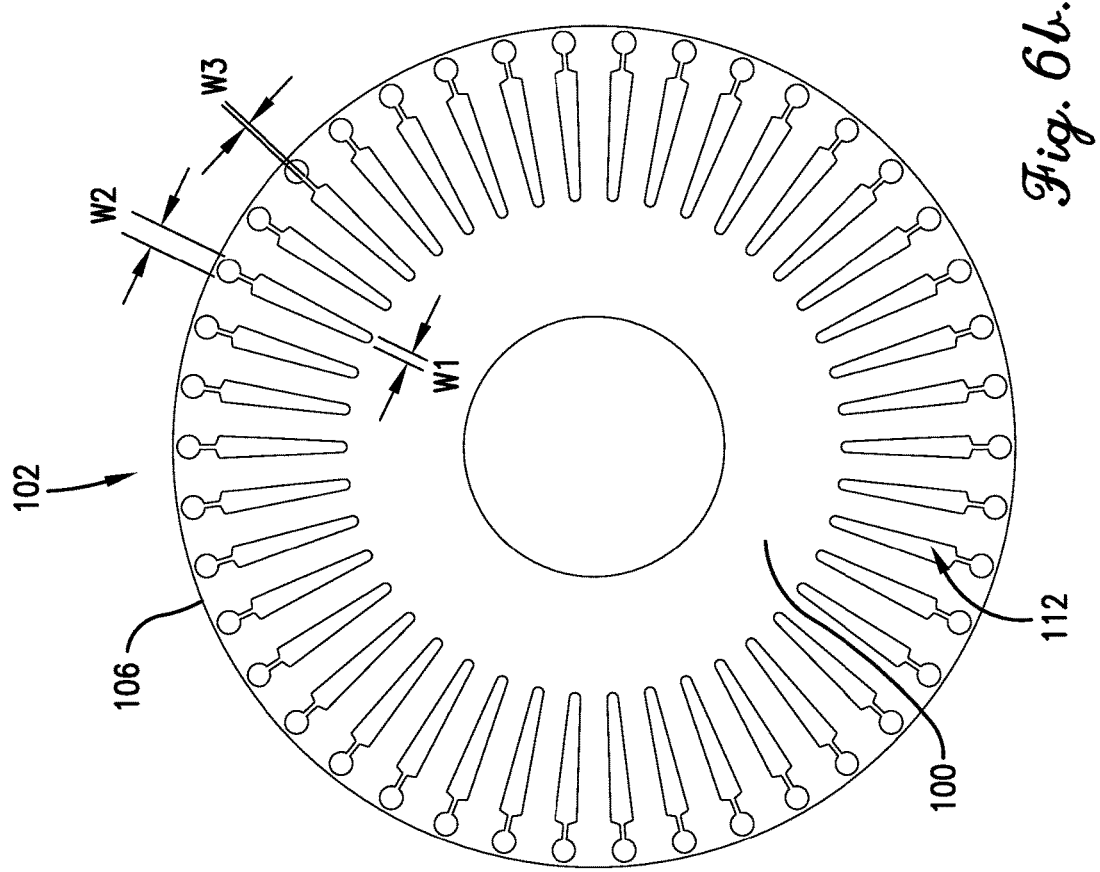
Figure 6A:
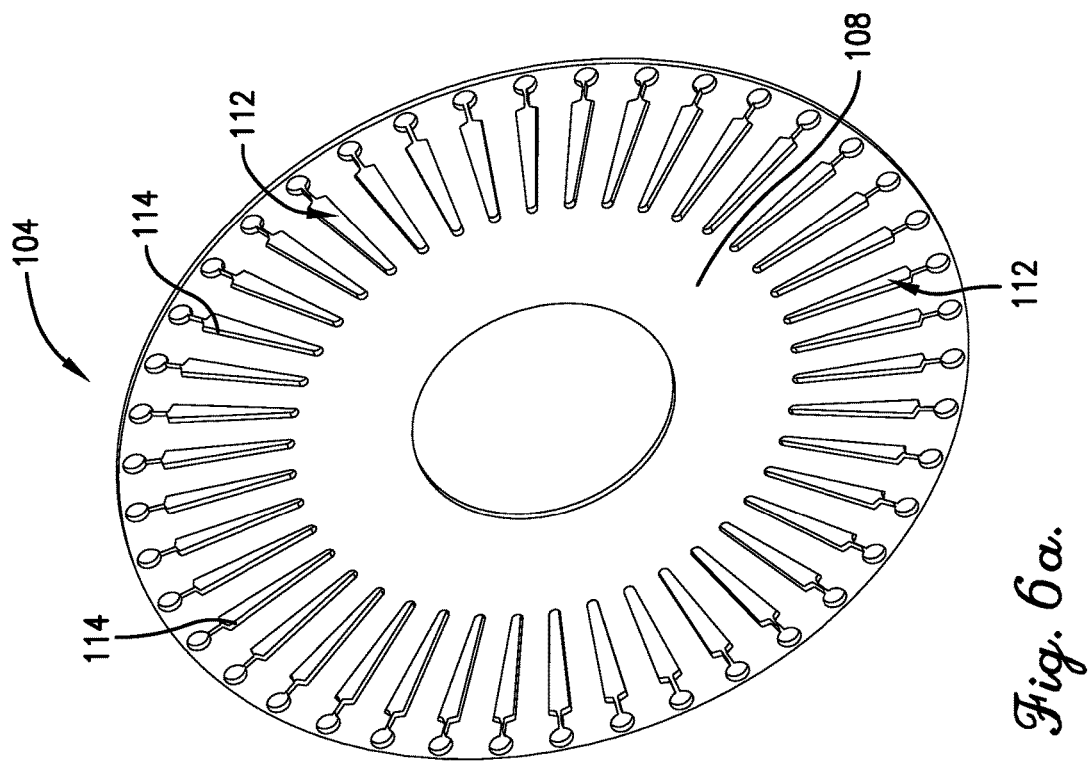

FIG. 5 is an enlarged, fragmentary, cross-radial sectional view of a portion of the rotor assembly of FIG. 1, depicting in detail a side profile of interior lamination surfaces of several rotor laminations that define a rotor bar slot, along with adjacent portions of front and back faces of the rotor laminations that are exposed to and partly define the rotor bar slot; and FIGS. 6a and 6b are, respectively, isometric and axial views of a rotor lamination of a rotor core according to a second embodiment of the present invention, depicting in detail the structural configuration of the lamination along opposite faces.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. Of particular note, conductive elements according to various aspects of the present invention may be utilized in a variety of armature assemblies and in dynamo-electric machines of all varieties. It will be understood by one having ordinary skill that the teachings presented herein in relation to a preferred embodiment that includes a motor may also be applied to such other dynamo-electric machines and applications. For instance, a rotating element of a dynamo-electric machine such as a generator may comprise an armature having one or more copper-impregnated polymer bars. The generator may be configured for use as an alternator or the like.

Turning now to the preferred embodiment illustrated in FIG. 1, an electric induction motor assembly 20 constructed in accordance with a preferred embodiment of the present invention is depicted. While the motor assembly 20 is useful in various applications, the illustrated embodiment has particular utility when configured for variable load for use in applications such as pumping water, wastewater, oil, slurry or the like, or for use in conveyors, condensers or the like. Further, the illustrated embodiment has particular utility when configured for frequent stopping and starting, such as for use in power tools, packaging lines or the like. Still further, the illustrated embodiment also has particular utility when configured for use in caustic and/or corrosive environments such as marine environments and in chemical plant pumps or the like.

Figure 2:
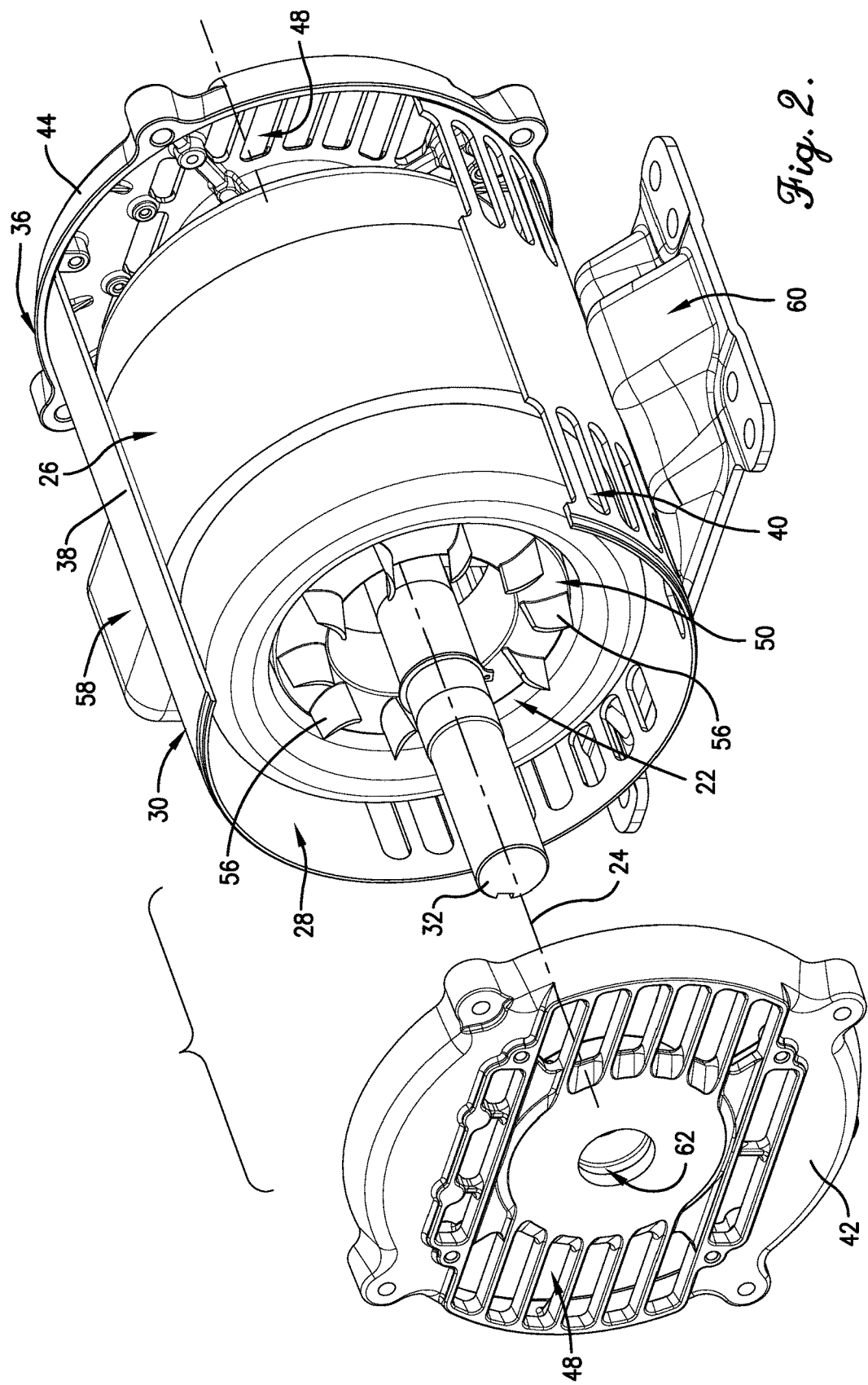
FIG. 2 is an isometric, partially exploded, partial sectional view of the induction motor assembly of FIG. 1, shown with part of a motor case in section and depicting a rotor assembly and a stator assembly disposed within the case that includes opposite endshields.

Turning more generally to FIGS. 1-2, as is customary, the motor assembly 20 broadly includes a rotor assembly 22, which is rotatable about an axis 24, and a stator assembly 26. The rotor assembly 22 and the stator assembly 26 are both contained within an internal motor chamber 28 that is defined by a motor case 30. The rotor assembly 22 includes an axially disposed shaft 32 that projects outwardly from one end of the motor case 30.

The stator assembly 26 is secured to the motor case 30 in a manner that limits rotation of the stator assembly 26 relative to the case 30. The rotor assembly 22 is mounted in a manner that allows it to rotate relative to the stator assembly 26 (and the case 30) about the axis 24. Various techniques and structures that are well known in the art can be used to mount the rotor assembly 22 and stator assembly 26 in the case 30. Thus, these techniques and structures will not be described in detail herein.

The motor case 30 is generally cylindrical and presents opposite axial end margins 34, 36. (See FIG. 1) The motor case 30 comprises a shell element 38 that includes a plurality of vent openings 40 disposed around a radially outer margin of the shell 38 to present a vented shell 38. It will be appreciated by one of ordinary skill in the art, however, that the alternative use of a non-vented shell (not shown) is clearly within the ambit of the present invention. The motor case 30 further comprises endshields 42, 44 disposed adjacent the axial end margins 34, 36, respectively, and secured to the shell 38. Each endshield 42, 44 may be secured to the shell 38 with a plurality of fasteners comprising bolts (not shown). However, it will be readily appreciated by one of ordinary skill in the art that either or both of the endshields 42, 44 could be alternatively secured to the shell 38, such as by welding or being integrally formed therewith, without departing from the teachings of the present invention.

Turning now to FIG. 2, it is noted that the endshields 42, 44 are substantially similar in many respects, and each endshield 42, 44 includes a plurality of vent openings 48 defined therethrough. The vent openings 48 permit vent air to flow in a generally axial direction to be exchanged between the ambient environment and inside the motor chamber 28 to cool the motor assembly 20 from heat generated during operation. In the illustrated embodiment, the vent openings 48 are defined by a grate pattern on the endshields 42, 44.

As discussed in more detail below, the rotor assembly 22 includes end rings 50, 52 fixed along axial ends of a rotor core 54. (See FIG. 3) A plurality of fan blades 56 extend axially away from each of the end rings 50, 52. The plurality of fan blades 56 are configured for rotation with the rotor assembly 22 to pull cooling vent air through the vent openings 40, 48 into the chamber 28, push the air out of the vent openings 40, 48 in the shell 38, and to otherwise circulate air within the chamber 28, in order to provide a cooling effect to the motor assembly 20. (See FIG. 2)

While only one embodiment is depicted here in detail, of course alternative cooling and/or venting arrangements, including a totally enclosed motor having a non-vented shell (not shown) and endshields without vent openings, are contemplated and are clearly within the ambit of the present invention.

Returning to FIG. 2 and description of the motor case 30, additional elements include a junction box 58 for receiving external electrical connections and mounting flanges 60, each of which substantially extends radially outside of the shell element 38. A bearing assembly 62 is also operably associated with a portion of each endshield 42, 44 for rotatably supporting the shaft 32. As will be readily appreciated by one of ordinary skill in the art, various aspects of the depicted motor case 30, including the endshields 42, 44, junction box 58 and mounting flanges 60, may take alternative forms without departing from the teachings of the present invention and will not be discussed in further detail herein.

Turning now to general discussion of the stator assembly 26 (and with reference to FIG. 2), the stator assembly 26 preferably broadly includes a plurality of axially stacked stator laminations (not shown) and windings (not shown). As will be readily appreciated by one of ordinary skill in the art, the particular configuration of the windings may directly impact the power, torque, voltage, operational speed, number of poles, etc. of the induction motor assembly 20. For example, the windings may be arranged such that the induction motor assembly 20 is configured as an eight-pole motor or a ten-pole motor. However, any of a number of alternative even numbers of poles are contemplated and are clearly within the ambit of the present invention.

Moreover, as will be readily appreciated by one having ordinary skill in the art, the stator assembly 26 may include any number of generally arcuate slots (not shown) defined by, and along a radially inner periphery of, the axially stacked stator laminations. The slots extend axially along the stator assembly 26 and the windings pass through the slots for receipt therein. It is noted that the stator assembly 26 may include various numbers of slots without departing from the teachings of the present invention.

It is also foreseen that the plurality of stacked stator laminations may be disposed in a loose lamination relationship with one another or may, for example, be welded, pressed, glued or the like, within the ambit of the present invention. Moreover, it is foreseen that the stator assembly may be solidly formed—for example of cast iron or cast aluminum alloy—without departing from the spirit of the present inventive concept. Because the various potential construction details of the stator assembly 26 are well known to one having ordinary skill in the art, they will not be discussed in further detail herein.

Turning next to construction details of the rotor assembly 22 (and with reference to FIGS. 2-5), the rotor assembly 22 broadly includes rotor core 54, which comprises a plurality of axially stacked rotor laminations 64 (see FIGS. 4a and 4b). The rotor assembly 22 includes a plurality of copper-impregnated polymer bars 66 associated with the rotor core 54. The copper-impregnated polymer bars 66 extend axially within an outer circumferential margin 68 of the rotor core 54. The copper-impregnated polymer bars 66 are integrally formed with copper-impregnated polymer end rings 50, 52 fixed respectively along axial end margins 70 of the rotor core 54, the axial end margins 70 generally corresponding to respective substantially planar lamination faces of the endmost rotor laminations 64.

As will be readily appreciated by one of ordinary skill in the art, the particular configuration of the bars 66 may directly impact operation of the induction motor assembly 20. In the illustrated embodiment, the plurality of bars 66 are not substantially skewed. However, it is foreseen that rotor bars of squirrel cage rotor assemblies according to embodiments of the present invention may skew slightly helically around the rotor core as the bars extend axially along the plurality of rotor laminations. Further, still other alternative configurations of bars, including but not limited to a more pronounced skew, are contemplated and are clearly within the ambit of the present invention.

With particular attention to FIGS. 4a and 4b, each individual rotor lamination 64 includes a substantially annular steel body 72, with the body 72 presenting first and second axially opposite lamination faces 74, 76. Each rotor lamination body 72 further presents a radially outer periphery 78, with the radially outer periphery 78 of the axially stacked rotor laminations 64 collectively corresponding to the outer circumferential margin 68. It is foreseen that, in some embodiments, the radially outer periphery of each rotor lamination body may be discontinuous, such as where exposed rotor bars are employed, without departing from the spirit of the invention.

Each rotor lamination body 72 presents an axial thickness, defined as the distance between the first lamination face 74 and the opposite second lamination face 76. Generally speaking, the body 72 is identified in the industry has having a nominal thickness of about twenty-two thousandths of an inch (0.022"). Accordingly, with reference to FIGS. 2-3, the size of the rotor assembly 22 is at least partially determined by the number of stacked rotor laminations 64 used in the construction of the motor assembly 20. As with the stator assembly laminations discussed above, it is foreseen that the axially stacked rotor laminations 64 may be loosely assembled, may be assembled by interlocking indentation tabs, and/or may be welded, pressed glued or the like without departing from the spirit of the present invention. Each rotor lamination body 72 further presents a generally, or at least partially, axially aligned shaft hole 80 extending axially therethrough to receive the shaft 32.

Each rotor lamination body 72 also presents a plurality of generally arcuately spaced slot apertures 82 extending axially therethrough. As shown in FIG. 3, the copper-impregnated polymer bars 66 are formed passing through the slot apertures 82. It is noted that in the illustrated embodiment, each rotor lamination body 72 includes thirty (30) slot apertures 82, although various numbers of slots may be similarly provided without departing from the teachings of the present invention. For example, as will be readily appreciated by one of ordinary skill in the art, variations in the configuration or the number of the slots, such as to present alternative arrangements of bars (including exposure and skew, discussed above), are contemplated and lie within the ambit of the present invention. More particularly, as will be discussed in more detail below in connection with FIGS. 6a and 6b, the improved ductility and casting durability of the copper-impregnated polymer of embodiments of the present invention preferably enables incorporation of a greater number of slots in applications where such an increase may, for example, improve the conversion of magnetic flux into rotational torque. It is also foreseen that the rotor lamination bodies may include one or more rotor venting holes extending axially therethrough without departing from the teachings of the present invention.

Returning to detailed description of the rotor lamination body 72, each slot aperture 82 is more particularly defined by an interior lamination surface 84 at least partly circumscribing the slot aperture 82. Each interior lamination surface 84 extends axially between the lamination faces 74, 76 to define its respective slot aperture 82. In the illustrated embodiment, each interior lamination surface 84 completely circumscribes its respective slot aperture 82. However, it is foreseen—for example in embodiments employing exposed rotor bars—that a radially outer periphery of each slot aperture may terminate in an open neck or the like and that, in such cases, the interior lamination surface will not completely circumscribe the slot aperture and may terminate upon reaching the open neck portion of the rotor lamination body 72 adjacent the outer circumferential margin 68. Moreover, as will be recognized by one having ordinary skill in the art and discussed in more detail below, interior lamination surfaces, slot apertures and copper-impregnated polymer bars may take a variety of different shapes without departing from the spirit of the present invention.

It is also noted that each rotor lamination 64 preferably includes an insulative coating (not shown). The use of insulative coatings for electrical steel is well-known in the industry, for example to reduce power loss and/or burr formation, restrict eddy currents to individual laminations, and increase corrosion resistance. Such coatings are generally classified by one or more standard setting organizations according to their various physical properties. Of particular note here, electrical steel coatings may be assigned thermal ratings (sometimes referred to as "burn out characteristics" or the like) correlating to maximum temperatures that may be withstood before permanent physical or magnetic property degradation is experienced.

In a preferred embodiment of the present invention, insulative coatings of the rotor laminations 64 preferably survive molding of the copper-impregnated polymer bars 66 and integral end rings 50, 52 despite having only moderate burn off resistance represented, for example, by a thermal rating of approximately nine hundred degrees Celsius (900° C.) or less. More preferably, such insulative coatings of the rotor laminations 64 survive the casting process despite having a low burn off resistance represented, for example, by a thermal rating of approximately five hundred degrees Celsius (500° C.) or less. In this manner, the insulative coating of each rotor lamination 64 is preferably retained along, and may substantially form, the interfaces between rotor laminations 64. This improvement on prior art copper squirrel cage motors—which typically lose insulative coating as a result of high temperatures during construction—means that an insulative coating of preferred embodiments may remain available for protection of the rotor core 54 throughout much of the life of the motor assembly 20. It is, however, foreseen that insulative coatings having a variety of characteristics, or no insulative coating at all, may be employed without departing from the spirit of the present invention.

Returning now to FIG. 3, the copper-impregnated polymer bars 66 may comprise a copper bearing plastic in varying proportions. For instance, the bars 66 may comprise, by weight, at least sixty percent (60%) copper and at least fifteen percent (15%) polymer. The bars 66 may also include impurities, fillers and/or catalysts for improving polymerization reactions without departing from the spirit of the present inventive concept. More preferably, the bars 66 may comprise, by weight, greater than seventy percent (70%) copper, less than twenty percent (20%) plastic, and the remainder mineral fillers and catalysts.

The copper of the bars 66 may comprise pure copper or a copper alloy, and the polymer may comprise polymers other than plastics without departing from the spirit of the present invention. The polymer may comprise epoxy resin such as diallyl phthalate.

Turning briefly now to consideration of electric motor efficiency, it may be readily appreciated by one of ordinary skill in the art that an energy cost associated with the operation of an electric motor over the lifetime of the motor can amount to a significant financial burden for an end user. Thus, an improvement in overall motor efficiency, even if such an improvement is only a relatively small percentage, can result in significant savings in energy costs over the lifetime of the motor. An inventive improvement to motor design or construction resulting in an efficiency gain, therefore, may provide significant competitive advantage.

Returning to the illustrated preferred embodiment, the copper-impregnated polymer bars 66 preferably confer a number of benefits on the construction of motor assembly 20. More particularly, the copper-impregnated polymer bars preferably exhibit conductivity of at least sixty-five percent (65%) IACS (the "International Annealed Copper Standard") at twenty degrees Celsius (20° C.) and impart the efficiency benefits associated with copper bar rotors of existing designs without many of the drawbacks. However, it is foreseen that lower conductivity may be exhibited by copper-impregnated polymer bars without departing from the spirit of the present invention.

Moreover, preferred copper-impregnated plastics used in embodiments of the present invention may exhibit high ductility at relatively low temperatures, permitting formation of integral copper squirrel cage components at lower pressures and temperatures than has previously been possible. This may reduce the occurrence of the types of collateral damage to surrounding portions of the rotor assembly 22—e.g., to the rotor core 54—which have been experienced with prior art versions of copper squirrel cage rotors. The use of copper-impregnated polymer bars 66 may also extend the life of the motor assembly 20 by enhancing corrosion and/or oxidation resistance compared to prior art, high efficiency copper squirrel cage motors. The lighter-weight copper-impregnated polymer bars 66 may additionally lead to lower rotational inertia and easier braking, again potentially extending the life of the motor assembly 20 relative to prior art, high efficiency copper squirrel cage motors.

It should again be noted that a variety of copper-filled polymers exhibiting improved ductility at reduced temperatures—the extent of which may vary according to the specific demands of particular situations and applications—may be used without departing from the spirit of the present invention. Moreover, again according to the demands of particular applications, a squirrel cage comprising copper-filled polymer according to embodiments of the present invention may be molded or otherwise constructed according to any of a number of known methods without departing from the spirit of the present invention. For example, such a squirrel cage may be constructed at least in part by injection molding, over molding, compression molding, etc.

Preferably, the copper-filled polymer chosen to form copper-impregnated polymer bars according to embodiments of the present invention is chosen so as to be machinable and stable at room temperature, and to withstand motor operating temperatures of two-hundred and twenty degrees Celsius (220° C.) or higher. In addition, a copper-filled polymer is preferably chosen that will not chemically or physically degrade under the temperature and pressure conditions of the applicable construction method (e.g., casting). For instance, a copper-filled diallyl phthalate powder—such as part numbers 811-138 and 811-139 sold by LECO® Corporation—may be utilized in embodiments of the present invention.

Turning now to FIG. 5, a partial sectioned rotor core 54 is illustrated, expanded to detail a side profile of interior lamination surfaces 84 of several rotor laminations 64 that define a portion of an exemplary rotor bar slot 86. Also depicted are portions of front and back substantially planar lamination faces 74, 76 of the rotor laminations 64 that are adjacent and exposed to the rotor bar slot 86.

As will be appreciated by one of ordinary skill, the rotor bar slot 86 is not defined by perfectly aligned surfaces of individual rotor laminations 64. More broadly, any group of stamped holes that defines a conductive bar cavity of a squirrel cage rotor may be regarded as at least slightly misaligned due to, for example, adoption of a skewed cage design, imperfect stacking and rotor construction and/or stamping burrs that deform the interfaces between laminations. For purposes of this discussion, even slight deviations from perfect alignment—such as by mere thousandths of an inch or less—are considerable as at least partial misalignments. It is noted that it is customary in the art to refer to "tolerances" and the like when determining degrees of acceptable misalignment between laminations.

Returning to FIG. 5, the exemplary rotor bar slot 86 comprises at least partially aligned slot apertures 82 of the individual rotor laminations 64. More particularly, the slot apertures 82 are at least partly circumscribed by interior lamination surfaces 84 that, together with exposed portions

88 of lamination faces 74, 76, define the exemplary rotor bar slot 86. As will be recognized by one having ordinary skill, the rotor bar slot 86 is axially bounded by the ends of the rotor core 54.

In the illustrated embodiment, a lamination 64 may abut an adjacent lamination 64 at an interface 90 along a lamination face 74. An exposed portion 88 may extend generally radially toward a center of the rotor bar slot 86 until it reaches a juncture with an interior lamination surface 84, which may be formed by a burr 92. The interior lamination surface 84 may then extend substantially axially until it reaches a juncture with an exposed portion 88 of the opposite lamination face 76 which, again, may be formed by a burr 92. The exposed portion 88 of the opposite lamination face 76 may extend substantially in a radial direction until reaching an interface 90 with another adjacent lamination 64.

In this manner, the rotor bar slot 86 is cooperatively defined by interior lamination surfaces 84 associated with the corresponding set of slot apertures 82 and any exposed portions 88 of the lamination faces 74, 76 adjacent the corresponding set of slot apertures 82. More particularly, an exposed slot surface area is defined by the associated lamination surfaces 84 and exposed portions 88 of the lamination faces 74, 76 that are within the axial boundaries of the rotor core 54, as discussed above.

Turning briefly to a discussion of conventional techniques and designs, it is noted that prior art references may loosely refer to the concept of "filled" conductive bar cavities, for example in describing various casting processes for forming conductive bars. However, a person of ordinary skill understands such a statement as being, for example, in reference to a rotor following completion of a casting step in which as much casting material has been injected into a cavity as is prudent according to the particular construction technique being employed. In any case, a person of ordinary skill nonetheless does not regard such statements as literally referring to physically completely filled cavities. For example, most commonly used molten copper and aluminum alloys thermally contract or shrink at least several percent upon cooling within a conductive bar cavity. For another example, most commonly used molten copper and aluminum alloys lack sufficient ductility—particularly once coming in contact with the edges of lamination steel—to adequately seep into interlaminar spaces. Therefore, conventional parlance in the art is commonly inaccurate to the extent of references to "filled" conductive bar cavities.

Returning to FIG. 5, preferred embodiments of the present invention utilize copper-impregnated polymer for forming a rotor bar (not shown in this FIG. 5) extending through the exemplary rotor bar slot 86. The copper-impregnated polymer preferably exhibits relatively nominal thermal shrinkage upon cooling in the rotor bar slot 86. More preferably, the copper-impregnated polymer is molded in the rotor bar slot 86 at a temperature relatively close to that of the surrounding laminations 64, and exhibits improved ductility in reaching interlaminar spaces during a casting process. Preferably, following construction, at least ninety-nine percent (99%) of the exposed slot surface area of the rotor core 54 is in direct contact with the molded copper-impregnated polymer bar. More preferably, at least ninety-nine and one-half percent (99.5%) of the exposed slot surface area of the rotor core 54 is in direct contact with the molded copper-impregnated polymer bar. As a result, a motor assembly constructed in accordance with embodiments of the present invention experiences less vibration during operation, and preferably has improved longevity and efficiency.

Returning briefly to FIG. 3, the illustrated preferred embodiment also includes end rings 50, 52 fixed along each axial end of the rotor core 54. The end rings 50, 52 extend circumferentially around axis 24 and electrical current that energizes the copper-impregnated polymer bars 66 of the rotor assembly 22 is conducted through the end rings 50, 52. The illustrated end rings 50, 52 and fan blades 56 are preferably integrally formed with the copper-impregnated polymer bars 66, for example during an injection molding process. However, for certain aspects of the present invention, end rings and fan blades may be alternatively constructed, for example through pre-fabrication or separate molding and assembly using appropriate adhesives, welding, brazing or soldering. Further, end rings and/or fan blades constructed of a different material than the copper-impregnated polymer bars are within the ambit of certain aspects of the present invention. Most preferably, however, the blades 56 are formed integrally with the end rings 50, 52.

The fan blades 56 extend axially from the end rings 50, 52 and are configured for rotation with the rotor assembly 22 to pull cooling vent air through the vent openings 40, 48 into the chamber 28, push the air out of the vent openings 40, 48 in the shell 38, and to otherwise circulate air within the chamber 28, in order to provide a cooling effect to the motor assembly 20. The fan blades 56 are suitably spaced angularly (e.g., evenly spaced) from one another about the axis 24. The fan blades 56 in the illustrated embodiment are suitably substantially identical to one another and spaced substantially uniformly from the axis 24. However, for certain aspects of the present invention, irregularly spaced or even inconsistently shaped fan blades may be employed.

The fan blades 56 include an outer radial edge 96 and an inner radial edge 98. A cupped face 100 extends between the outer radial edge 96 and the inner radial edge 98. Advantageously, use of copper-impregnated polymer according to embodiments of the present invention permit the formation of a cupped face 100 integrally with the end rings 50, 52 and bars 66. That is, preferred embodiments of the present invention may be constructed by molding methods that produce an integral squirrel cage complete with fan blades having enhanced cooling ability due to the incorporation of cupped faces. However, for certain aspects of the present invention, straight or substantially planar fan blades may be employed.

More particularly, the cupped face 100 of each fan blade 56 is preferably arcuately shaped so as to bow or curve and define a recess or depression 102 as it extends between the outer radial edge 96 and the inner radial edge 98. During operation, the depression 102 is preferably oriented to face a direction of rotation of the rotor assembly 22. In this manner, the fan blades 56 increase engagement with surrounding fluid or air, leading to more aggressive air circulation and better cooling. Although the fan blades 56 of the illustrated embodiment have arcuately shaped cupped faces 100, it will be appreciated upon review of this disclosure that a cupped face of fan blades may also or alternatively present a V-shape or other shape formed from two or more planar surfaces, an arcuate surface combined with a planar surface, or the like without departing from the spirit of the present invention.

It is further noted that no fan blades and/or an independent cooling/fan system may be used without departing from the spirit of the present invention. For instance, some electric motors include passive cooling features, such as cooling fins and the like, to facilitate heat transfer out of the motor. Some electric motors include active cooling systems, such as a forced air ventilation systems. For example, a fan can be attached to the output shaft so rotation of the output shaft rotates the fan to generate air flow to cool the motor. Active cooling systems and passive cooling features such as cooling fins can be used in combination.

Returning to more general discussion, it is again noted that in certain embodiments of the present invention, it is desirable to shape copper-impregnated polymer bars of a squirrel cage induction motor in varying ways to maximize particular performance parameters. Exemplary parameters may include start-up torque, full-load efficiency, locked rotor current, and/or other parameters. As will be appreciated by one having ordinary skill, altering the size, shape and/or number of conductive rotor bars may permit optimization of one or more performance parameter(s).

Conventional technologies do, however, impose limits on the size, shape and/or number of conductive rotor bars that may be incorporated into a particular assembly. Of particular relevance here, forming slots for conductive rotor bars that have relatively narrow cross-sectional dimensions using existing technologies can lead to a less rugged and, in some cases, fragile squirrel cage rotor assembly. Moreover, known casting materials and techniques may be inadequate to properly fill such narrow slots, due at least in part to poor ductility and rapid cooling that occurs when the molten casting material contacts relatively cool rotor laminations. Resulting conductive rotor bars may be easily broken and/or may exhibit an undesirable degree of porosity.

Turning now to the embodiment of the present invention depicted in FIGS. 6a and 6b, it is noted that a person of ordinary skill will recognize that slots having the general depicted shape may be used in multi-cage slot rotors. Such rotors may exhibit improved performance in a number of areas; for example, multi-cage slot rotors may experience improved starting frequency isolation to starting bars, which may be desirable in certain applications. However, a rotor lamination 104 as illustrated in FIGS. 6a and 6b is similar in some respects to the rotor lamination 64 described above, and may be employed in much the same way within a motor assembly substantially as described above. Therefore, for the sake of brevity, only the unique aspects of this additional embodiment of the rotor lamination 104 will be described in detail, with a complete disclosure of the similar and interoperable motor components being readily understood by one of ordinary skill in the art upon a review of the disclosure above.

The rotor lamination 104 presents a radially outer periphery 106 and opposite substantially planar lamination faces 108, 110. The rotor lamination 104 also presents forty-two (42) arcuately-spaced multi-cage rotor slot apertures 112. Each slot aperture 112 is defined by an interior lamination surface 114 extending axially between the lamination faces 108, 110 to define a respective slot aperture 112 within the radially outer periphery 106.

Advantageously, copper-impregnated polymer bars according to embodiments of the invention may be molded in slots having exceptionally narrow cross-sectional dimensions while providing improved squirrel cage integrity and performance over prior art technologies. With particular reference to the embodiment of FIGS. 6a and 6b, each slot aperture 112 presents a minimum cross-sectional dimension w3 measured circumferentially across the slot aperture 112 at a neck or bridge of the slot aperture 112 that is about three hundredths of an inch (0.03") wide. In preferred embodiments, the minimum cross-sectional dimension of each slot aperture is between about three hundredths of an inch (0.03") and about thirty-five thousandths of an inch (0.035"). Rotor assemblies according to embodiments of the present invention may, for example, have an increased number of multi-cage slots within a given area of rotor core and may exhibit improved conversion of magnetic flux into rotational torque.

It is again noted that one having ordinary skill will appreciate that the present invention embraces slot apertures of varying shapes. Of particular relevance here, one having ordinary skill would understand that reduction in the overall size of slot apertures of the general type depicted in FIGS. 6a and 6b is generally restricted, at least in part, by the ability to form a neck or bridge of sufficient width to withstand the rigors of formation, assembly and operation.

One having ordinary skill could also identify one or more cross-dimensional aspects of slots having different shapes which, by virtue of their narrowness and resulting fragility, prevent further reduction in size according to known technologies and casting materials. It will also be appreciated that such cross-dimensional aspects generally do not extend parallel to a radial axis, i.e., they do not generally correspond to the height of the slot as conductive bar slots are generally taller in this sense than they are wide. Instead, a minimum cross-sectional dimension will generally be measured at least partially in a cross-radial direction. Moreover, such cross-dimensional dimensions will typically correspond to segments along an interior lamination surface that generally oppose one another across the slot aperture. Preferably, the generally opposing segments extend radially at a substantially constant angular relationship. For instance, the minimum cross-sectional dimension w3 of FIG. 6b is measured between two opposing segments of interior lamination surfaces 114 that extend radially in a substantially parallel relationship to one another to form a neck or bridge of the slot aperture 112. Preferably, the minimum cross-sectional dimension of slots having a variety of shapes may be reduced from what is currently possible to within a range of between about three hundredths of an inch (0.03") and about thirty-five thousandths of an inch (0.035") according to embodiments of the present invention.

It is noted that the present description uses numerical ranges to quantify certain parameters relating to the invention. It is to be understood that when numerical ranges are provided, such ranges are to be construed as providing literal support for claim limitations that only recite the lower value of the range as well as claim limitations that only recite the upper value of the range. For example, a disclosed numerical range of between about nine thousandths (0.009) and eleven thousandths (0.011) inches provides literal support for a claim reciting "greater than 0.009" (with no upper bounds) and a claim reciting "less than 0.011" (with no lower bounds). It is further noted that the numerical ranges of dimensions disclosed herein are rather critical within the relative scope of the ranges provides, as will be readily appreciated by one of ordinary skill in the art.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A rotating element for a dynamo-electric machine, the rotating element comprising:
   a core comprising a plurality of axially stacked laminations cooperatively defining a plurality of arcuately spaced bar slots;
   a plurality of bars, each bar extending through one of the bar slots;
   an end ring fixed along each axial end of the core, each end ring being in electrical contact with each of the plurality of bars; and
   a plurality of fan blades projecting from each of said end rings,
   said plurality of bars comprising copper-impregnated polymer,
   said bars exhibiting electrical conductivity of at least 65% IACS at 20° C.,
   each of said fan blades having a radial outer edge, a radial inner edge, and a cupped face extending between the radial outer edge and the radial inner edge,
   said fan blades, said end rings and said bars being integrally formed of the copper-impregnated polymer.

2. The rotating element as claimed in claim 1, wherein said bars comprise, by weight, at least sixty percent (60%) copper and at least fifteen percent (15%) polymer.

3. The rotating element as claimed in claim 1, wherein said polymer comprises epoxy resin.

4. The rotating element as claimed in claim 1, wherein said cupped face is substantially arcuate.

5. The rotating element as claimed in claim 1, wherein the laminations abut one another at interfaces, the interfaces substantially being formed by an insulative coating thermally rated to a maximum temperature below nine hundred degrees Celsius (900° C.).

6. The rotating element as claimed in claim 5, wherein the insulative coating is thermally rated to a maximum temperature below five hundred degrees Celsius (500° C.).

7. The rotating element as claimed in claim 1, wherein—
   each of the laminations includes opposite substantially planar lamination faces and a plurality of arcuately spaced interior lamination surfaces, with each interior lamination surface extending axially between the lamination faces to define a respective slot aperture,
   the slot apertures of adjacent laminations are at least partially aligned, such that an aligned set of slot apertures correspond with each bar slot,
   each bar slot is cooperatively defined by the lamination surfaces associated with the corresponding set of slot apertures and any exposed portions of the lamination faces adjacent the corresponding set of slot apertures, such that an exposed slot surface area is presented by the associated lamination surfaces and any exposed portions of the lamination faces,
   each bar is in direct contact with the core along at least ninety-nine percent (99%) of the exposed slot surface area.

8. The rotating element as claimed in claim 7, wherein the laminations abut one another at interfaces, the interfaces substantially being formed by an insulative coating thermally rated to a maximum temperature below nine hundred degrees Celsius (900° C.).

9. The rotating element as claimed in claim 8, wherein the insulative coating is thermally rated to a maximum temperature below five hundred degrees Celsius (500° C.).

10. The rotating element as claimed in claim 1, wherein—
    each of the laminations defines a radially outer periphery,
    each of the laminations includes opposite substantially planar lamination faces and a plurality of arcuately spaced interior lamination surfaces, with each interior lamination surface extending axially between the lamination faces to define a respective slot aperture,
    each slot aperture is radially within the radially outer periphery,
    each slot aperture presents a minimum cross-sectional dimension measured circumferentially across the slot aperture,
    the minimum cross-sectional dimension is between about three hundredths of an inch (0.03") and about thirty-five thousandths of an inch (0.035").

11. The rotating element as claimed in claim 10, wherein the laminations abut one another at interfaces, the interfaces substantially being formed by an insulative coating thermally rated to a maximum temperature below nine hundred degrees Celsius (900° C.).

12. The rotating element as claimed in claim 11, wherein the insulative coating is thermally rated to a maximum temperature below five hundred degrees Celsius (500° C.).

13. The rotating element as claimed in claim 1, wherein—
    each of the laminations includes opposite substantially planar lamination faces and a plurality of arcuately spaced interior lamination surfaces, with each interior lamination surface extending axially between the lamination faces to define a respective slot aperture,
    the slot apertures of adjacent laminations are at least partially aligned, such that an aligned set of slot apertures correspond with each bar slot,
    each bar slot is cooperatively defined by the lamination surfaces associated with the corresponding set of slot apertures and any exposed portions of the lamination faces adjacent the corresponding set of slot apertures, such that an exposed slot surface area is presented by the associated lamination surfaces and any exposed portions of the lamination faces,
    each bar is in direct contact with the core along at least ninety-nine percent (99%) of the exposed slot surface area,
    each of the laminations defines a radially outer periphery,
    each of the laminations includes opposite substantially planar lamination faces and a plurality of arcuately spaced interior lamination surfaces, with each interior lamination surface extending axially between the lamination faces to define a respective slot aperture,
    each slot aperture is radially within the radially outer periphery,
    each slot aperture presents a minimum cross-sectional dimension measured circumferentially across the slot aperture,
    the minimum cross-sectional dimension is between about three hundredths of an inch (0.03") and about thirty-five thousandths of an inch (0.035").

14. A rotating element for a dynamo-electric machine, the rotating element comprising:
    a core comprising a plurality of axially stacked laminations cooperatively defining a plurality of arcuately spaced bar slots;
    a plurality of bars, each bar extending through one of the bar slots;
    an end ring fixed along each axial end of the core, each end ring being in electrical contact with each of the plurality of bars; and a plurality of fan blades projecting from each of said end rings, each of said fan blades having a radial outer edge, a radial inner edge, and a cupped face extending between the radial outer edge and the radial inner edge, said plurality of bars comprising copper-impregnated polymer, wherein— each of the laminations defines a radially outer periphery, each of the laminations includes opposite substantially planar lamination faces and a plurality of arcuately spaced interior lamination surfaces, with each interior lamination surface extending axially between the lamination faces to define a respective slot aperture, each slot aperture is radially within the radially outer periphery, each slot aperture presents a minimum cross-sectional dimension measured circumferentially across the slot aperture, the minimum cross-sectional dimension is between about three hundredths of an inch (0.03") and about thirty-five thousandths of an inch (0.035").

15. The rotating element as claimed in claim 14, wherein said fan blades, said end rings and said bars are integrally formed of the copper-impregnated polymer.

16. The rotating element as claimed in claim 15, wherein the bars exhibit electrical conductivity of at least 65% IACS at 20° C.

* * * * *